H. C. GUTTRIDGE.
HORSE COLLAR.
APPLICATION FILED FEB. 17, 1913.
1,159,665.
Patented Nov. 9, 1915.
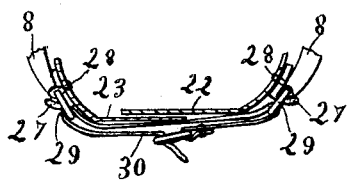
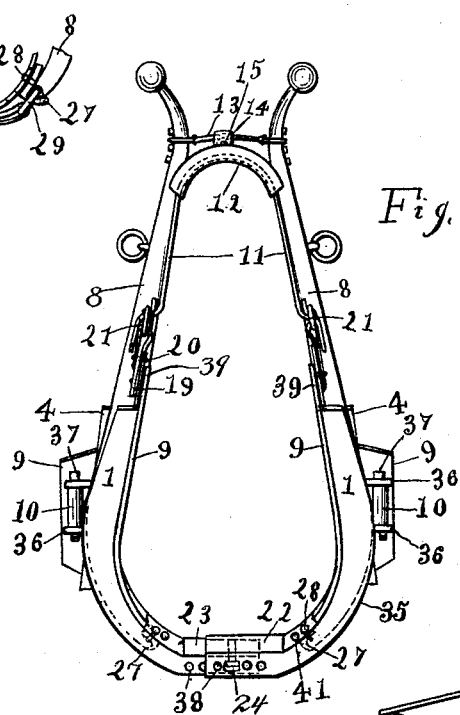
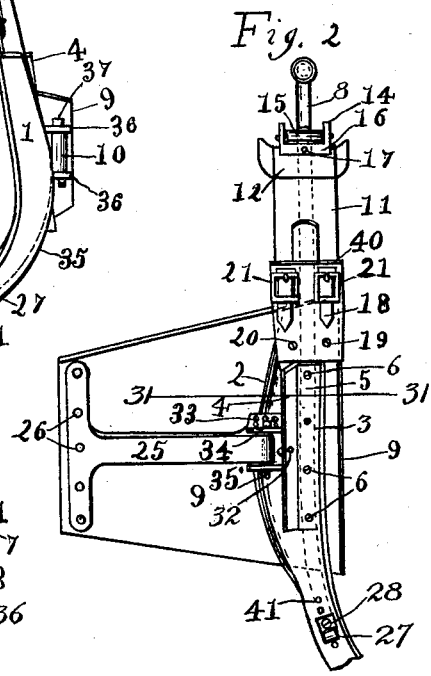
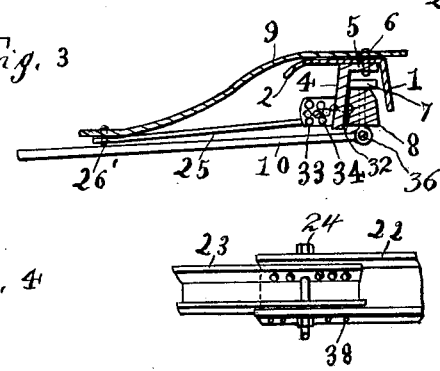
WITNESSES:
W. Brown
I. E. Ward
INVENTOR.
Homer C. Guttridge
BY
W. Stewart Brown
ATTORNEY.
COLUMBIA PLANOGRAPH CO., WASHINGTON, D. C.

UNITED STATES PATENT OFFICE.

HOMER C. GUTTRIDGE, OF CULLISON, KANSAS.

HORSE-COLLAR.

1,159,665.  Specification of Letters Patent.  Patented Nov. 9, 1915.

Application filed February 17, 1913. Serial No. 749,006.

*To all whom it may concern:*

Be it known that I, HOMER C. GUTTRIDGE, a resident of Cullison, in the county of Pratt and State of Kansas, have invented certain new and useful Improvements in Horse-Collars; and I do hereby declare the following to be a full, clear, and exact description of the invention, such as will enable others skilled in the art to which it appertains to make and use the same.

This invention relates to improvements in horse collars, and has for one of its objects to provide a simple and economical device which may be readily adjusted to fit the necks and shoulders of horses of various sizes and forms and which is arranged to bear upon the neck and shoulders of the horse only at the points where the pressure is to be applied.

Another object of the invention is to provide a horse collar which is light in structure, durable, and which obviates the objectionable cushioned or filled collars ordinarily employed.

Another object is to construct a collar whose principal part is steel or other suitable material, having adjustable features whereby the collar can be adjusted to fit the horse, so that the vibration of the collar will be coincident with the movement of the horse and will not bruise or chafe the said horse.

I am aware that certain horse collars have been made, whose principal parts were steel and were designed to avoid any filling and were also designed to be somewhat adjustable. But the salient feature of my invention resides in the construction and assembling of parts to be hereinafter illustrated in the accompanying drawings and described in the specification, and succinctly defined in the appended claims, in which—

Figure 1 is a front elevation of my collar, having thereon a pair of hames now in general use. Fig. 2, a side elevation. Fig. 3, a sectional view of Fig. 2 on the line 31—31. Fig. 4 a view of Fig. 1, looking from the bottom. Fig. 5, a view of a portion of Fig. 1, showing how the hames are secured on hooks affixed to the collar and the hames buckled together.

Similar numerals designate similar parts throughout the several views.

Referring to the drawings, 1 and 2 designate the lower half of my collar, which is in two sections, and 2 will be referred to hereinafter, as shoulder-plates and 1 as a supporting flange. The rear edges of the shoulder-plates 2 are somewhat curved as seen in Figs. 2 and 3. The flange 1 is approximately at right angles to plate 2. Both are curved as seen at 35 and terminate in channels 22 and 23 which are provided with holes 38, Fig. 4, and are adapted to telescope and are rigidly and adjustably affixed together by a bolt 24 to fit necks of various thicknesses. It is to be noted that the lower portion of each section is somewhat inclined forward as seen in Fig. 2, which is for the purpose of giving the animal throat clearance, which is a very important feature, to provide against the horse being choked when exerting great force against the collar.

Substantially parallel with the supporting flanges 1 are wings 4 having lateral bends 5 which are rigidly secured to the shoulder plates 2 by rivets 6. Adjacent said bends are lugs 7 exending transversely from said wings nearly to the flanges 1. The function of these lugs is to prevent the upper part of the hames from contacting the horse's neck.

Secured to the plates 2 by the rivets 6 are shoulder bearings 9, made of leather or other suitable material, of a frame best shown in Fig. 2. U-shaped loops 33, having a multiplicity of holes 34 therein, are affixed to the wings 4 with rivets 32. Pivotally connected to said loops by pins 35′ are T-shaped arms 25 extending rearwardly and outwardly nearly as far as the shoulder bearings 9, and said arms are provided with a series of holes 26 for the reception of rivets or screws 26′ which serve to unite the arms and members 9 rigidly together, which gives the said members bends as best seen in Fig. 3, which fit the horse's shoulders. Special attention is called to the functions of the arms 25. It will be seen that the said arms being outwardly inclined, will allow the rear ends of the shoulder bearings to yield laterally and thereby a yielding contact of the shoulder bearings to the horse's shoulders is insured. Extending from the hames 8 are eye-bolts 36 having pins 37 to which are hingedly secured traces 10.

The members 2 extend somewhat above the members as at 39, to which portions are affixed members 19 with rivets 20. Said members are provided with buckles 21 and holes 40. A neck band 11 has on each of its ends billet tongues 18 adapted to pass through the holes 40 and engage the buckles 21.

Thus it will be seen, I can adjust the collar to any desired length.

I provide a member 16 somewhat curved on its lower side and having upwardly extending lugs 14, between which is pivoted a roller 15. The neck-band is positioned between this member and a pad 12. The members 12 and 14 and the neck band are all affixed together by rivets 17. It is to be noted one of the functions of the plate 16 is to insure a uniform pressure of the pad 12 on the horse's neck, while the roller yieldingly adjusts the pad with respect to the hames.

Having described the construction and assembling of my invention, I will describe its operations generally. When I place my collar on a horse's neck, I adjust its width by means of the telescoping device at the bottom of the collar and its length by shortening the neck band 11. I then place the hames 8 on the collar, passing the strap 13 over the roller 15 and I then place the links 29 on the curved lugs 27 (see Fig. 5), these lugs being adjustably affixed to the members 2 by bolts 28 as by placing the bolts in any of the holes 41 (best shown in Fig. 2), the hames are then secured together by the usual strap 30. The lugs 7 (see Fig. 3) prevent the hame getting in contact with the sides of the horse's neck.

One of the very important features of my device is the arm 25 by which means I am enabled to laterally adjust the free end of the shoulder member 9 as the various shapes of horses' shoulders require a greater or less curve in the member 9 and if the free end of the member 9 is allowed to contact the shoulder, the injury would be great, hence it is obvious that by adjusting the end of the member 25 to fit the various holes 34 and securing it in any desired position by the bolts 35', I can set the free end in the desired position.

What I claim is—

1. A horse collar in two sections arranged to telescope together at their lower ends, hames having links at their lower ends, means affixed to said sections to prevent the hames from contacting the horse's neck, means permitting lateral adjustment of said sections to fit necks of various thicknesses, said means being constructed and arranged to hold said sections rigidly in adjusted position, said sections comprising shoulder plates rearwardly and outwardly curved, shoulder bearings affixed to the plates and rearwardly extending, supporting flanges, wings extending from the shoulder plates and arranged to receive the hames between themselves and the supporting flanges, and lugs on said shoulder plates to receive the links at the lower ends of the hames, and a strap to hold said hames on said lugs.

2. A horse collar in two sections arranged to telescope together at their lower ends, hames having links at their lower ends, means affixed to said sections to prevent the hames from contacting the horse's neck, means permitting lateral adjustment of said sections to fit necks of various thicknesses, said means being constructed and arranged to hold said sections rigidly in adjusted position, said sections comprising shoulder plates rearwardly and outwardly curved, shoulder bearings affixed to the plates and rearwardly extending, supporting flanges, wings extending from the shoulder plates and arranged to receive the hames between themselves and the supporting flanges, lugs on said shoulder plates to receive the links at the lower ends of the hames, U-shaped loops affixed to said wings, and T-shaped arms pivotally connected to said loops and extending rearwardly and outwardly and having their rear portions rigidly affixed to the shoulder-bearing members, whereby the shoulder bearing members may be moved laterally into any desired position to suit animals with thick or thin shoulders and a strap to hold said hames on said lugs.

In testimony whereof, I have signed this specification in the presence of two subscribing witnesses.

HOMER C. GUTTRIDGE.

Witnesses:
A. BACHTEL,
A. E. DEMAREE.

Copies of this patent may be obtained for five cents each, by addressing the "Commissioner of Patents, Washington, D. C."